United States Patent Office 3,741,908
Patented June 26, 1973

3,741,908
DEPURATIVE PROCESS AND COMPOSITION
James Howard Dailey, Detroit, Mich., assignor to
Chemetron Corporation, Chicago, Ill.
No Drawing. Continuation-in-part of application Ser. No. 853,976, Aug. 28, 1969. This application Mar. 4, 1970, Ser. No. 16,584
Int. Cl. B01d 17/04
U.S. Cl. 252—330    12 Claims

ABSTRACT OF THE DISCLOSURE

This invention relates to a method for resolving oil-water mixtures and emulsions into separate phases and includes a composition comprising a critical proportion of iron and calcium salts, the calcium to iron ratio being from about 1.5:1 to about 5:1.

CROSS-REFERENCE

This application is a continuation-in-part of application Ser. No. 853,976, filed Aug. 28, 1969.

BACKGROUND OF THE INVENTION

Mixed oil and water wastes originating in industrial plants in the form of soluble oil coolants, quenches, grinding compounds, emulsions and di-phase metal cleaners pose a problem for waste disposal. Various governmental agencies set requirements for maximum amounts of ether extractable materials which can be contained in waste water. Because waste materials frequently are not separated prior to treatment and may be of widely varying composition, the processes of the prior art tend to give highly erratic results.

It is known in the art to break oil and water emulsions with calcium chloride, aluminum sulfate, ferric or ferrous chloride with or without the use of sulfuric acid. These metal salts are used singly with the pH of the emulsion in the range of 2.5 to 6.0. The prior art compositions and methods often are not very efficient in separating ether or chloroform extractables from water to a level of one hundred parts per million or less of such materials. Thus, the water layer requires further treatment or clarification before disposal to meet the present government requirements of 15 to 25 p.p.m. ether or chloroform extractables. Moreover, the oil-phase which does separate often cannot be incinerated or economically refined because of its high water content.

Efficient use of the emulsion breakers of the prior art frequently requires a rather critical concentration. If too little or too much of the emulsion breaker is added, the desired separation of oil does not occur and the effluent is turbid. Addition of a large quantity of treating material such as ferric chloride may result in a floc so voluminous that phase isolation becomes a practical impossibility.

The following illustrations exemplify the deficiencies of the prior art:

To an aqueous cooling emulsion having a substantially neutral pH and prepared from a commercially available product to contain about 1.8% by weight of naphthenic oil was added 11% by weight aqueous ferric chloride in increasing amounts with results as indicated in Table I.

TABLE I.—EMULSION TREATMENT WITH AQUEOUS FERRIC CHLORIDE

| Conc. ferric iron, p.p.m. | Appearance | Chloroform extraction, p.p.m. |
|---|---|---|
| 77.5 | Milky | |
| 155 | do | |
| 232 | Clear effluent | 0 |
| 271 | do | |
| 310 | do | |
| 348 | do | 60 |
| 390 | do | 77 |
| 465 | Turbid effluent | |

It will be noted that the milky appearance of the oil disappeared when the ferric ion concentration was increased from 155 to about 232 parts per million and when it reached 271 parts per million the aqueous effluent was substantially free of chloroform extractables. Upon continued addition, however, the quantity of chloroform extractables increased so that 390 parts per million of ferric iron caused an extractable content of 77 parts per million. A ferric iron concentration of more than 465 parts per million of iron resulted in a turbid effluent.

When the experiment was repeated substituting calcium chloride solution to a concentration of 1,296 p.p.m. calcium for the ferric chloride, no separation of oil was obtained.

In another instance, ferric chloride solution containing 11% by weight ferric chloride was added to a grinding emulsion containing one percent by weight naphthenic oil. A clear effluent appeared when the ferric chloride concentration was around 250 parts per million. Further additions of ferric chloride to increase the concentration to 1,000 p.p.m. and further to 2,000 parts per million developed a floc of such large volume that no separation was feasible.

Such treatment characteristics as the foregoing make it very difficult for untrained personnel to accomplish satisfactory water purification so that there remains a need for a process and composition which gives consistently good results over a range of conditions.

THE INVENTION

This invention relates to an oil separating composition and to a process for its use which operates efficiently and effectively over a range of concentrations. This invention has for an object the provision of an emulsion breaking composition and method which separates oil from aqueous wastes of mixed types. Another object of this invention is the provision of a composition for separating oil and water from an oil and water mixture. It is another object of this invention to provide a novel composition and process which can separate oil and water from an oil in water emulsion so that the water contains less than 50 parts per million of ether extractable material. Still another object of the present invention is the provision of a composition and process for separating oil from oil in water emulsions which composition can be composed of readily available and economical materials. It is yet another object of this invention to provide a composition and process for separating oil from water so that the water content of the oil is less than ten percent thus permitting incineration of the oil portion.

The foregoing objects are accomplished and the shortcomings of the prior art are overcome by the present composition and process wherein there is established in the oil-water mixture to be treated a concentration of ferric iron and calcium.

The calcium and iron are introduced into the oily aqueous material to be treated in a critical proportion wherein the weight ratio of calcium to iron is from about 1.5:1 to about 5:1. In a preferred embodiment these metals are added in the form of their soluble salts, preferably the chloride salts, in a proportion to provide a calcium to iron ratio of from about 2.5:1 to about 3.5:1. The preferred aqueous solution contains calcium chloride in the amount of 15 to 30% by weight, ferric chloride in the amount of 6 to 12% by weight, ½ to 1% by weight of hydrochloric acid with the balance being water.

In the process of employing this composition the pH of the oily aqueous material is adjusted to be from about 3 to about 10.5 and a pH of from about 7 to about 9 is preferred. A sufficient quantity of the composition of this invention is added to establish a concentration of from about 10 to about 3,000 parts per mililon of the iron and calcium. Good results are obtained when the concentration is from about 100 to about 2,000 p.p.m. and a preferred concentration range is from about 500 to about 2,000 p.p.m.

When employing the composition of this invention the oily aqueous material is first agitated to provide a mixture which is at least superficially uniform to which is added the solution of iron and calcium. As the agitation is continued a floc forms which generally associates with the oil and tends to float to the surface. A quiescent period is then provided so that the separated oil can form a discrete phase for isolation. Customarily the calcium and iron added appear in the oil layer along with any dirt, contaminants, slime, sludge and the like; the aqueous solution is regularly clear and displays little, if any, increase in dissolved solids content.

The cutting and cooling oils encountered contain surfactants which emulsify the oil. It may be that the iron and calcium salts react with at least some of the surfactants to release the oil for isolation.

The process of the invention may be practiced in a standard separation chamber which has a skimming means at the top to enable removal of the upper phase and a drain at the bottom for withdrawal of the lower phase. Such apparatus affords either a continuous or batch method of operation with the novel composition.

The following examples are presented in order to disclose the invention more fully. It should be understood, however, that they are illustrative only and not intended to limit the invention in any way.

EXAMPLE I

Preparation of calcium and iron solutions.—Into a large rubber lined tank is placed 56.83 parts by weight of water having a temperature of 100° F. Into the water is mixed by stirring 43.17 parts by weight of anhydrous calcium chloride. After the calcium chloride is completely dissolved in the water, 69.5 parts by weight of the calcium chloride solution are drawn off and placed in a rubber lined tank with 30.0 parts by weight of 42° Bé. ferric chloride (which contains 39% by weight $FeCl_3$) and 0.5 part by weight of 20° Bé. muriatic acid (32% HCl).

The resulting solution is agitated with an air wand to complete mixing and provides about 4 parts of iron and 10.5 parts of calcium per 100 parts of solution. Ferric chloride and calcium chloride comprise about 40% of the total weight of the solution.

EXAMPLE II

In the preparation of an alternate solution the same procedure for admixing is followed as outlined in Example I except that different quantities of material are employed. Water in the amount of 82.25 parts by weight and calcium chloride in the amount of 17.75 parts by weight are employed to compose the chloride solution. Eighty-four and five-tenths parts by weight of this solution are separated and to it are added 15.0 parts by weight of 42° Bé. ferric chloride and 0.5 part by weight of 20° Bé. muriatic acid.

The resulting solution is highly acidic and contains about 2 parts ferric iron and about 5.3 parts of calcium per 100 parts of solution. Ferric chloride and calcium chloride comprise about 20% by weight of the total solution.

EXAMPLE III

One thousand gallons of an aqueous effluent from an automobile manufacturing plant containing 125 parts per million of chloroform extractable material and having a substantially neutral pH were placed in a treating tank and agitated. To it was added 1 to 2 gallons of the solution of Example I which was sufficient to provide 58 to 114 p.p.m. iron and 156 to 312 p.p.m. calcium. After thorough mixing, the agitation was discontinued and the oily floc separated to give a clear water effluent having a pH of from 6.5 to 7 and a chloroform extractable content of 18 parts per million.

EXAMPLE IV

To an effluent aqueous waste from a rolling mill containing 80,000 parts per million of oil was added sufficient sodium hydroxide to raise the pH to between 7.1 and 7.2. For each 1,000 gallons of waste, 5 to 6 gallons of the solution of Example I were added with agitation after which the treated solution was allowed to remain quietly while the oil layer separated. The total salts added ranged from about 1,000 to about 1,300 p.p.m. This type of waste was treated repeatedly to yield an aqueous phase containing less than 15 parts per million of chloroform extractable material. In some samples no extractables were found. The isolated oil phase was successfully burned as fuel in an incinerator.

EXAMPLE V

To 1,000 gallons of an aqueous waste having a pH from 6.8 to 7.2 and containing 10,000 parts per million of a kerosine type oil having a high flash point were added 7.5 gallons of the solution of Example I to provide about 1,600 p.p.m. of iron and calcium. After agitation the oil was allowed to separate leaving an aqueous phase containing 5 parts per million of ether extractable material.

The extraction procedure employed in these examples is similar to that set forth in the "Standard Methods for the Examination of Water and Waste Water," published by the American Public Health Association. In some instances chloroform was substituted for the petroleum ether solvent.

EXAMPLE VI

Aqueous emulsions having a nearly neutral pH are prepared to contain about 1% and about 1.8% naphthenic oil, respectively. To samples of these emulsions at room temperature are added various amounts of ferric chloride and calcium chloride solutions. The mixtures are agitated for 15 minutes and then maintained quietly for one hour. Results are shown in Table II.

TABLE II.—OIL-IN-WATER EMULSION TREATMENT

| Oil, percent | Iron, p.p.m. | Calcium, p.p.m. | Aqueous phase | Extractables, p.p.m. |
|---|---|---|---|---|
| 1.0 | 101 | 158 | Milky | |
|  | 202 | 315 | Clear | |
|  | 304 | 473 | do | 0 |
| 1.0 | 121 | 324 | No good | |
|  | 161 | 432 | Clear | |
|  | 242 | 648 | do | |
|  | 282 | 756 | do | |
|  | 232 | 864 | do | |
|  | 483 | 1,296 | do | |
| 1.0 | 74 | 230 | Milky | |
|  | 148 | 460 | Clear | |
|  | 222 | 691 | do | |
|  | 222 | 1,080 | do | |
| 1.8 | 121 | 324 | Turbid | |
|  | 161 | 432 | Clear | |
|  | 242 | 648 | do | 30 |
|  | 232 | 864 | do | 15 |
|  | 483 | 1,296 | do | 0 |
| 1.8 | 74 | 230 | Milky | |
|  | 148 | 461 | Turbid | |
|  | 222 | 691 | Clear | |
|  | 222 | 1,080 | do | |

The manner of use of the composition of this invention is not critical and is readily adaptable to standard disposal systems for oil and water emulsions. The emulsion should be agitated to insure uniformity and preferably the pH range should be adjusted to be between 7.0 to 9.0. Agitation with 10 to 3,000 parts per million of ferric and calcium ions is continued until good contact between the emulsion and the ions is achieved. After the agitation, sufficient time is allowed for the two phases to separate. Thereafter they are isolated and disposed of in accordance with good commercial practice.

In the foregoing examples, polyvalent metallic ion solutions containing iron and calcium were employed. If desired, magnesium ions and aluminum ions could be added in amounts comparable to the iron and calcium ion concentrations. It will be noted that the source of iron and calcium is a solution of chloride salts. However, if desired, other salts such as ferric sulfate, ferric nitrate, or other inorganic water soluble ferric salt can be used if added separately. Likewise, the aluminum and magnesium can be present in the form of alum, aluminum chloride, aluminum fluoride, magnesium sulfate or magnesium chloride or inorganic water soluble salts thereof. While hydrochloric acid is the preferred inorganic acid for the aqueous polyvalent composition other inorganic acids such as sulfuric and nitric can be employed for pH adjustment.

Others may practice the invention in any of the numerous ways which will be suggested by this disclosure to one skilled in the art by employing one or more of the novel features disclosed or equivalents thereof. All such practices of the invention is considered to be a part hereof provided it falls within the scope of the appended claims.

What is claimed is:

1. The process for separating oil from an aqueous oil bearing mixture consisting essentially of the steps of agitating said aqueous mixture, adjusting the pH to from about 3.0 to about 10.5, adding a sufficient quantity of a water soluble inorganic salt selected from the class consisting of ferric iron salts, calcium salts and a mixture thereof to provide in said aqueous mixture a concentration of ferric ion and calcium ion of from about 100 to about 3000 parts per million by weight, the proportion of calcium to iron being from about 1.5:1 to about 5:1 and, after said addition, maintaining the mixture in a quiescent state for a time sufficient to operate an oil phase.

2. The process according to claim 1 wherein the total iron and calcium are equal to more than about 500 parts per million.

3. The process as defined in claim 1 wherein the source of said ferric ion is ferric chloride.

4. The process as defined in claim 1 wherein the source of said calcium ion is calcium chloride.

5. The process as defined in claim 1 wherein said pH is adjusted to be between about 7.0–9.0.

6. The process of claim 1 wherein the proportion of calcium to iron is in the ratio of from about 2.5:1 to about 3.5:1.

7. The process of claim 1 wherein said iron and calcium concentration is established by the addition of an aqueous solution comprising from about 20 to about 40% of a mixture of ferric chloride and calcium chloride.

8. A composition for separating oil from an aqueous oil bearing mixture consisting essentially of an aqueous solution of an inorganic ferric iron salt and an inorganic calcium salt, the proportion of calcium to iron being in the ratio from about 1.5:1 to about 5:1.

9. The composition of claim 8 wherein the calcium and iron are present as their chloride salts and comprise from about 20 to about 40% by weight of the solution.

10. The composition of claim 8 wherein the calcium and iron are in the proportion of from about 2.5 to about 3.5:1.

11. The composition of claim 8 including an organic acid.

12. The composition of claim 9 including hydrochloric acid.

References Cited

UNITED STATES PATENTS

| 2,162,281 | 6/1939 | Ledbetter | 252—338 |
| 2,204,812 | 6/1940 | Muskat | 252—358 |
| 2,686,593 | 8/1954 | Vogel et al. | 209—172.5 |

OTHER REFERENCES

Eldridge et al.: Sewage Works Journal, v. 20, pp. 849–56 (1948).

Berkman et al.: "Emulsions and Foams," pp. 285–293 (except 290), Reinhold Pub. Co. (1941).

JOHN D. WELSH, Primary Examiner

U.S. Cl. X.R.

252—358, 60